(12) United States Patent
Bruns et al.

(10) Patent No.: US 11,015,085 B2
(45) Date of Patent: *May 25, 2021

(54) SHINGLE ROOFING COATING METHOD AND COMPOSITION

(71) Applicant: ASPHALT SCIENCES LLC, Reno, NV (US)

(72) Inventors: Joseph Randall Bruns, Reno, NV (US); Hashem Hashemi, Reno, NV (US); Moises Cisneros Rached, Reno, NV (US)

(73) Assignee: ASPHALT SCIENCES LLC, Reno, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 16/853,548

(22) Filed: Apr. 20, 2020

(65) Prior Publication Data

US 2020/0385610 A1 Dec. 10, 2020

Related U.S. Application Data

(63) Continuation of application No. 15/898,187, filed on Feb. 15, 2018, now Pat. No. 10,626,295, which is a continuation of application No. 14/880,586, filed on Oct. 12, 2015, now Pat. No. 9,909,031.

(60) Provisional application No. 62/062,664, filed on Oct. 10, 2014.

(51) Int. Cl.
| | |
|---|---|
| *C09D 195/00* | (2006.01) |
| *C09D 123/14* | (2006.01) |
| *D06N 5/00* | (2006.01) |
| *D06N 3/10* | (2006.01) |
| *C08L 95/00* | (2006.01) |
| *C09D 123/26* | (2006.01) |
| *C09D 153/02* | (2006.01) |

(52) U.S. Cl.
CPC ............ *C09D 195/00* (2013.01); *C08L 95/00* (2013.01); *C09D 123/14* (2013.01); *C09D 123/26* (2013.01); *C09D 153/02* (2013.01); *D06N 3/106* (2013.01); *D06N 5/003* (2013.01)

(58) Field of Classification Search
CPC ........ C08L 9/00; C08L 9/005; C08L 2555/80; C08L 2555/82; C08L 2555/84; C08L 2555/86; C08L 2555/34
See application file for complete search history.

(56) References Cited

U.S. PATENT DOCUMENTS

| | | | |
|---|---|---|---|
| 4,068,023 A | 1/1978 | Nielsen et al. | |
| 4,837,252 A | 6/1989 | Seguin et al. | |
| 5,256,712 A | 10/1993 | Langumier et al. | |
| 5,342,866 A | 8/1994 | Trumbore et al. | |
| 6,036,843 A | 3/2000 | Marzari et al. | |
| 7,951,239 B2 | 5/2011 | Trumbore et al. | |
| 2009/0105376 A1 | 4/2009 | Korenstra et al. | |
| 2009/0194002 A1 | 8/2009 | Maldonado et al. | |
| 2014/0261076 A1* | 9/2014 | Quinn .................... | C08K 5/103 106/246 |

FOREIGN PATENT DOCUMENTS

EP 2581418 A1 4/2013

OTHER PUBLICATIONS

Jones, David R. IV, Ph.D., et al. "The Asphalt Model: Results of the SHRP Asphalt Research Program," SHRP A-001 Contract, Center for the Transportation Research, University of Texas, Austin TX, USA, 11 pages.

* cited by examiner

*Primary Examiner* — Christopher M Rodd
(74) *Attorney, Agent, or Firm* — Kerr IP Group, LLC

(57) ABSTRACT

An asphalt composition for use as a shingle roof coating is described. The asphalt composition includes a first asphalt feedstock and a first concentrate. The first concentrate includes an elastomeric polymer and an asphalt flux. The asphalt composition includes 0.5% to 6% by weight of the elastomeric polymer. The elastomeric polymer includes a styrenic block copolymer. The first concentrate includes 3% by weight to 25% by weight of the styrenic block copolymer. The first concentrate includes 3% by weight to 15% by weight of one of an ethylene polymer and an ethylene propylene copolymer. The first concentrate has a penetration of at least 100 dmm.

9 Claims, 3 Drawing Sheets

SHINGLE ROOFING COATING METHOD AND COMPOSITION

CROSS REFERENCE

This patent application is a continuation of utility patent application Ser. No. 15/898,187, filed on Feb. 15, 2018, entitled SHINGLE ROOFING COATING AND COMPOSITION, which is a continuation of utility patent application Ser. No. 14/880,586, (now U.S. Pat. No. 9,909,031), filed Oct. 12, 2015, entitled SHINGLE ROOFING COATING METHOD AND COMPOSITION, which claims the benefit of provisional patent application 62/062,664, filed date Oct. 10, 2014, entitled SHINGLE ROOFING COATING METHOD AND COMPOSITION; all of which patent applications are incorporated by reference in this patent application filing.

FIELD

This invention relates to a shingle roofing coating method and composition. More specifically, the invention relates to oxidizing an asphalt feedstock and then reconstituting the asphalt feedstock with a pre-blended and a pre-heated polymer and flux combination.

BACKGROUND

Asphalt is a complex colloid comprised of asphaltenes suspended in oils and resins commonly referred to as the maltene fraction. The chemical composition of the maltene fraction has a significant effect on the penetration, softening point, and viscosity of asphalt as lighter components are converted into larger molecules.

Crude oils are a naturally occurring complex mixture composed predominantly of hydrogen and carbon containing compounds. They vary widely in relative amounts and characteristics of different hydrocarbons. There are various systems for classification of crude oil. One such system classifies oil as paraffin, asphaltic (naphthenic), or mixed-based depending upon the type of hydrocarbon present in the crude. Alternatively, crude oil may be classified as heavy crude (20-25 API gravity), refining crude (25-35 API gravity) or light crude (35-40 API gravity). Heavy crudes (20-25 API gravity) are favored for production of asphalts because these crudes are rich in asphaltenes.

Petroleum asphalt may not conform to paving or industrial grade specifications and air blowing may be used to prepare the asphalt material for paving and roofing applications. The air blowing process includes bubbling air through an asphalt mixture to oxidize some of the constituents. Additionally, air blowing may also include the use of a catalyst to accelerate reactions.

In U.S. Pat. No. 7,951,239, Trumbore describes the secondary addition of a wax to increase the softening point of non-coating grade asphalt to provide a penetration that is near the target of 15 dmm. Further, Trumbore requires careful monitoring to prevent the penetration from dropping below the target penetration of 15 dmm during the oxidation process to meet both the penetration and softening point specification of ASTM 3462.

SUMMARY

An asphalt composition for use as a shingle roof coating is described. The asphalt composition includes a first asphalt feedstock and a first concentrate. The first concentrate includes an elastomeric polymer and an asphalt flux. The asphalt composition includes 0.5% to 6% by weight of the elastomeric polymer. The elastomeric polymer includes a styrenic block copolymer. The first concentrate includes 3% by weight to 25% by weight of the styrenic block copolymer. The first concentrate includes 3% by weight to 15% by weight of one of an ethylene polymer and an ethylene propylene copolymer. The first concentrate has a penetration of at least 100 dmm.

In one embodiment, the asphalt composition of claim 1 includes 0.5% to 4.5% by weight of the elastomeric polymer.

In another illustrative embodiment, the asphalt composition has a penetration that exceeds 15 dmm and a softening point that is above 190° F.

In yet another illustrative embodiment, the asphalt composition has a penetration that exceeds 50 dmm and a softening point that is above 190° F.

In still another illustrative embodiment, the first asphalt feedstock has a softening point greater than 220° F. and a penetration less than 10 dmm at 77° F.

In a further illustrative embodiment, the styrenic block copolymer includes Styrene-Butadiene-Styrene (SBS).

In a still further illustrative embodiment, the first concentrate includes 3% by weight to 15% by weight of the styrenic block copolymer in the asphalt flux, wherein the first concentrate has a penetration of at least 100 dmm.

In a yet further illustrative embodiment, the first asphalt feedstock includes a mixture of non-roofing grade asphalts and reclaimed oils.

In a still further illustrative embodiment, the first asphalt feedstock includes a mixture of non-roofing grade asphalts and high flash refinery oils.

FIGURES

The present invention will be more fully understood by reference to the following drawings which are presented for illustrative, not limiting, purposes.

DESCRIPTION

Figure 1:
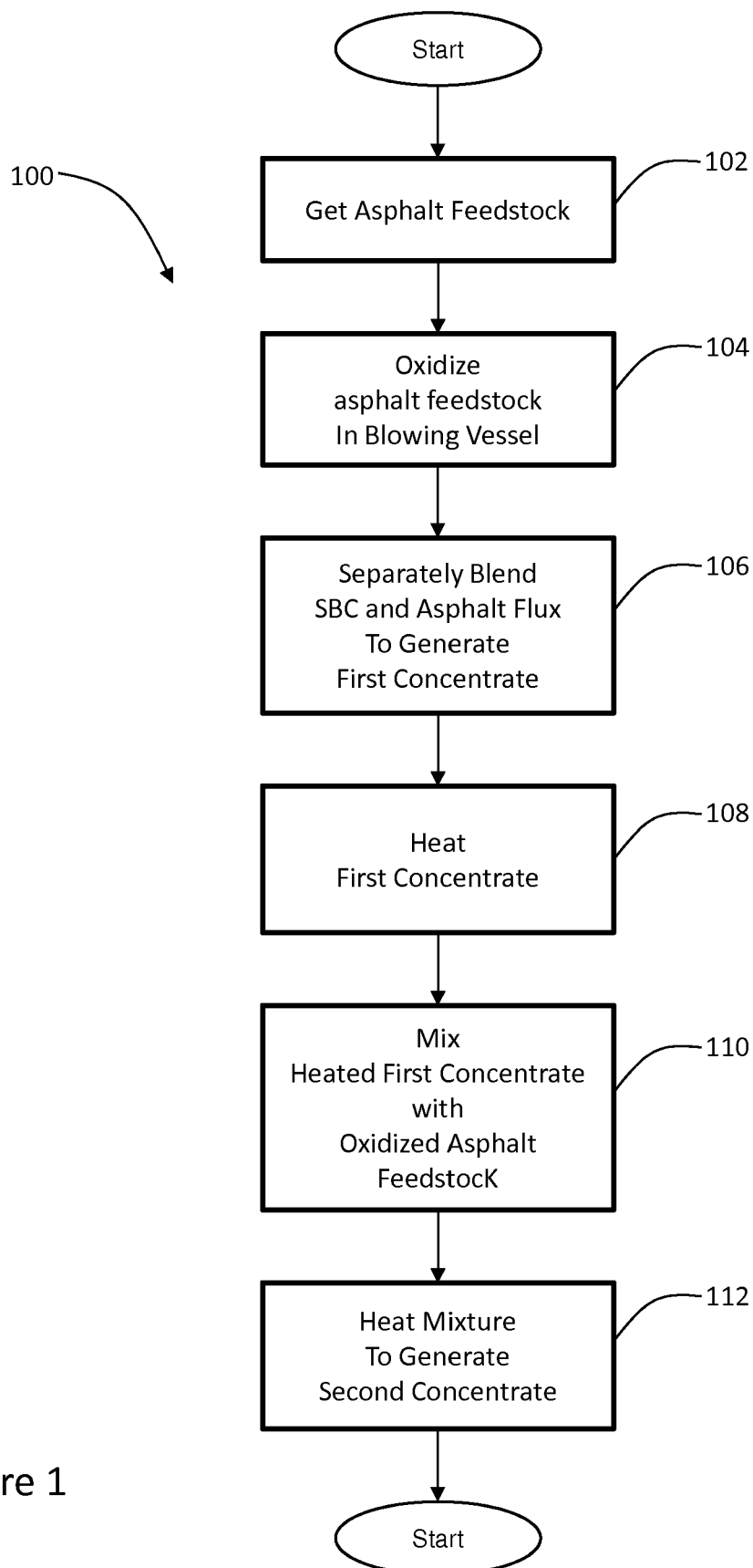
FIG. 1 shows an illustrative flow chart of a method for generating a coating such as an illustrative shingle roofing coating from relatively poor quality asphalt feed stocks.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the methods and compositions described herein may vary as to configuration and as to details. Additionally, the methods may vary as to details, order of the actions, or other variations without departing from the illustrative methods disclosed herein.

There are various challenges to improving shingle roofing coating and, generally, the addition of oils and asphalts as a secondary process step to modify roofing coating is not a common practice. Even if oils are used to modify coatings the result is that the penetration can be increased to above 15 dmm, but the softening point will typically drop below the ASTM 3462 requirements of 190° F. Additionally, oil modified coatings often cause significant staining on roofing shingles as these oil components will move to the surface and discolor the granule surfacing. Also, the rate of penetration changes with temperature with the addition of oils that result in excessive scuffing of the roof granules from the shingles due to foot traffic during installation in hot weather.

Asphalt feedstocks must meet specific requirements. These requirements include producing coating asphalts for roofing shingles that meet the softening point requirements of 190° F. or greater and a penetration of 15 dmm or greater as described in ASTM 3462, which is hereby incorporated by reference. Another requirement includes lowering the asphalt feedstock penetration into a range where the granules may be properly pressed without becoming too brittle. Yet another requirement includes raising the melt viscosity of the asphalt feedstock so that when filler is added the filled coating viscosity allows a roofing shingle process to run at high speeds. A further requirement is to create a shingle that will perform over many years on a roof in spite of being exposed to sun, high temperatures and rain.

Special feedstocks that meet the specific requirement of ASTM 3462 are in short supply. The methods and compositions presented herein have been developed to allow the use of a wide range of asphalt types such as vacuum tower bottoms, recycled oils and paving grade asphalts as asphalt feedstocks.

Unless otherwise stated, the following terms used in this application, including the specification and claims, have the definitions given below. It must be noted that as used in the specification and the appended claims, the singular forms "a," "an," and "the" include plural references unless the context clearly dictates otherwise.

"Optional" or "optionally" means that the subsequently described event or circumstance may, but need not, occur, and that the description includes instances where the event or circumstance occurs and instances in which it does not.

The terms "those defined above" and "those defined herein" when referring to a variable incorporates by reference the broad definition of the variable as well as preferred, more preferred, and most preferred definitions, if any.

The term "asphalt" is defined by the American Society for Testing and Material (ASTM) as a dark brown to black cementitious material solid or semi solid in consistency, in which the predominating constituents are bitumens which occur in nature as such or are obtained in residue in refining petroleum. Asphalt is a constituent of most crude petroleum. More generally, the present compositions and methods described herein consider asphalt a colloidal system. Asphalt is composed of asphaltenes and maltenes. The relative amounts of asphaltenes and maltenes determine the physical and chemical behavior of any given asphalt.

The term "bitumen" refers to a generic term that according to ASTM relates to a mixture of hydrocarbons of natural or pyrogenous origin, or a combination of both, frequently accompanied by their non metallic derivates, which may be gaseous, liquid, semisolid, or solid and which are completely soluble in carbon disulphide. In commercial practice the term bitumen is used for the semisolid or solid bitumen which includes asphalts, tars and pitches. The latter two materials are obtained by destructive heat action on crude oil, coal and other organic materials.

Generally, the term "flux" refers to an asphaltic residue used to soften asphalt to a desired consistency. More specifically, the term "flux" refers to an oil or asphalt component having a COC flash in excess of 550° F.

The term "asphaltene(s)" refers to the portion of asphalt that is naphtha insoluble, so that in excess of naphtha the asphaltenes are insoluble. The asphaltenes may represent up to 50% of asphalt, in which a major portion of total oxygen, nitrogen, sulfur, nickel and vanadium are concentrated. Asphaltenes are brown to black amorphous solids. Then have carbon/hydrogen ratios of 0.81-1.00 which indicates they are aromatic in nature. Their molecular weight ranges from 500-7000.

The term "maltene" refers to the naphtha soluble portion of asphalt. The maltene fraction is free of asphaltenes and carbenes. The maltene carbon/hydrogen ratio is in the range of 0.6-0.75 which indicates that the molecular structure includes aliphatic chains or saturated rings. The maltene fraction includes resins and oils. The molecular weights are in the range of 500-1500.

The term "resins" refers to cyclic aromatic compounds.

The term "oils" refers to saturated hydrocarbons having appreciable wax content.

The term "carbenes" refers to the highest carbon content fraction of asphalt. Carbenes are insoluble in carbon tetrachloride. Carbenes, if present, occur in trace amounts.

The term "asphalt feedstock" refers to an asphalt starting material. Typically, the chemical composition and physical properties.

The term "blown asphalt" refers to the process of changing the properties of asphalt feedstock by oxidation with atmospheric oxygen and, typically, high temperatures. Petroleum asphalts are obtained during crude oil production as atmospheric/vacuum residues or as extracts from lubricating oil production. The properties of these asphaltic materials are greatly dependent on the nature of crude oil and the refinery processes employed. These asphalts do not necessarily conform to roofing requirements. To improve their properties, asphalts are oxidized by air blowing. Asphalts used for roofing and coating applications require a material with lower penetration and a higher softening point. This is achieved by air blowing at a high temperature.

Air blowing of asphalt is a process to increase the softening point with low temperature susceptibility. Air blowing is a heterogeneous reaction between gas and liquid phases. When an asphalt is oxidized, its specific gravity and hardness is increased, and the ductility of the product becomes much lower. Factors which influence the rate of hardening are: construction and design of the reactor, characteristics of feed, temperature and blowing, air rate, and degree of dispersion and catalysts.

Various physical and chemical changes occur during air blowing and these physical changes are measured by determining the penetration and softening point.

The term "penetration" refers to the depth a standard steel needle with a truncated cone penetrates a properly prepared sample of asphalt. Penetration is related to hardness or consistency of the asphalt. The apparatus which permits the needle holder to move vertically without fraction and measures the depth of penetration to the nearest 0.1 mm is known as penetrometer. The distance that the needle penetrates in units of tenths of a millimeter is the penetration value. The weight of the needle is 50 g and another 50 g weight is placed on the needle, which results in a 100 g weight. The needle is slowly lowered onto a sample until it just makes contact with the surface of the sample. The dial of the penetrometer is adjusted to zero and the needle is released quickly for the specified period of five seconds and the distance penetrated is measured to the tenth of a millimeter.

The term "softening point" refers to a measure of temperature in which a steel ball passes through a ring that includes the asphalt sample and falls a distance of 2.54 cm, when the specimen, ball and bath of water/glycerin are heating at a specified rate. A steel ball, 9.54 mm in diameter, is placed in each ball centering guide.

The term "viscosity" refers to the viscosity determination of asphalt at elevated temperatures using a rotational viscometer as described in ASTM D4402, which is hereby incorporated by reference.

The term Styrenic Block Copolymer (SBC) refers to a large category of thermoplastic elastomers. SBCs possess the mechanical properties of rubbers, and the processing characteristics of thermoplastics. There are three major types of SBCs, namely, Styrene-Butadiene-Styrene (SBS) block polymers, Styrene-isoprene-styrene (SIS) block copolymers and hydrogenated styrenic block copolymers (HSBC).

The term "asphalt flux" refers to an asphaltic residue used to soften asphalt to a desired consistency. The asphalt flux may include original asphalt feedstock that has not been oxidized. Additionally, the asphalt flux may also include other compounds that may be used to soften the asphalt.

The term "flux back" refers to the process of mixing original asphalt feedstock, i.e. non-oxidized feedstock, with Styrenic Block Copolymer (SBC) to generate a "first concentrate" and then mixing the oxidized asphalt feedstock with the first concentrate to generate a desired second concentrate that has the desired physical properties, i.e. penetration, softening point and viscosity.

The methods and compositions presented herein include three steps, in which the first step is to oxidize an asphalt feedstock, which results in converting the majority of the maltene fraction (in the feedstock asphalt) into asphaltene. The process of measuring the conversion or removal of the maltene fraction to asphaltene in the feedstock asphalt includes monitoring some of the physical properties, namely, penetration and softening point. More specifically, the oxidation of the feedstock asphalt is performed so that the penetration falls below 15 dmm, and preferably near or below 10 dmm.

A mixture of roofing grade asphalts is oxidized to an ASTM D36 softening point of 205Q F or higher allowing the ASTM D5 penetration at 77Q F to drop below the minimum specification value of 15 dmm. The oxidation may be conducted with or without catalyst that can be added before or during the oxidation process.

The next step is to generate a first concentrate that includes mixing a styrenic block copolymer (SBC) with an asphalt flux. There are various types of polymers and asphalt fluxes that can be used to generate the first concentrate. The first concentrate is pre-blended in a separate vessel, which is then heated to a temperature of approximately 360° F. for approximately 30-60 minutes.

For example, a 16% by weight of the SBC is combined with a 4% by weight of the asphalt flux in the first concentrate. The asphalt flux may be a San Joaquin Refining Base Oil "Reffene 2000L;" this oil has a flash point of 420° F. The asphalt flux used to prepare the first concentrate may have a flash point down to 415° F. However, any asphalt entering the oxidation process should have a flash of at least 550° F. More generally, soft asphalt fluxes that are compatible with SBC or SBS are used. For example, the soft asphalt fluxes that are compatible with SBS and typically have a D2007 Clay Gel analysis with Aromatics of about 20% to 40% and asphaltenes of less than 20% are used as asphalt fluxes.

In the final step, the first concentrate is mixed with oxidized asphalt feedstock at 350° F.-450° F. for a period of 30 minutes to 1 hour to generate a second concentrate, which is also referred to a shingle roof coating. The terms second concentrate and shingle roof coating may be used interchangeably in specific instances. However, it shall be appreciated that the methods and compositions presented herein are not limited to the shingle roof coating applications and may also be used for paving asphalt applications and oil drilling fluid preparations. The second concentrate, which is the resulting shingle roof coating, satisfies the requirements of the ASTM 3462 specifications.

By way of example and not of limitation, a mixture of 25% by weight of the first concentrate is mixed with 75% by weight of the oxidized asphalt feedstock resulting in the second concentrate having a 4% by weight of SBC.

Referring to FIG. 1, there is shown an illustrative flow chart of a method 100 for generating a coating such as an illustrative shingle roofing coating from relatively poor quality asphalt feedstocks. The method and compositions presented herein generate an asphalt feedstock that has physical characteristics that include an appropriate viscosity, a low penetration, and a low softening point that meets ASTM 3462 requirements.

Oxidizing the Asphalt Feedstock

The method is initiated at block 102 wherein an asphalt feedstock is obtained. Illustrative asphalt feedstocks include oils (process oils and reclaimed motor oils) such as PG Blend Asphalt which may obtained from San Joaquin Refining, Valero, Marathon, Conoco Philips, and Safety Clean which is located at refineries in CA, OK, LA, MO, and numerous reclamation facilities respectively.

Figure 2:
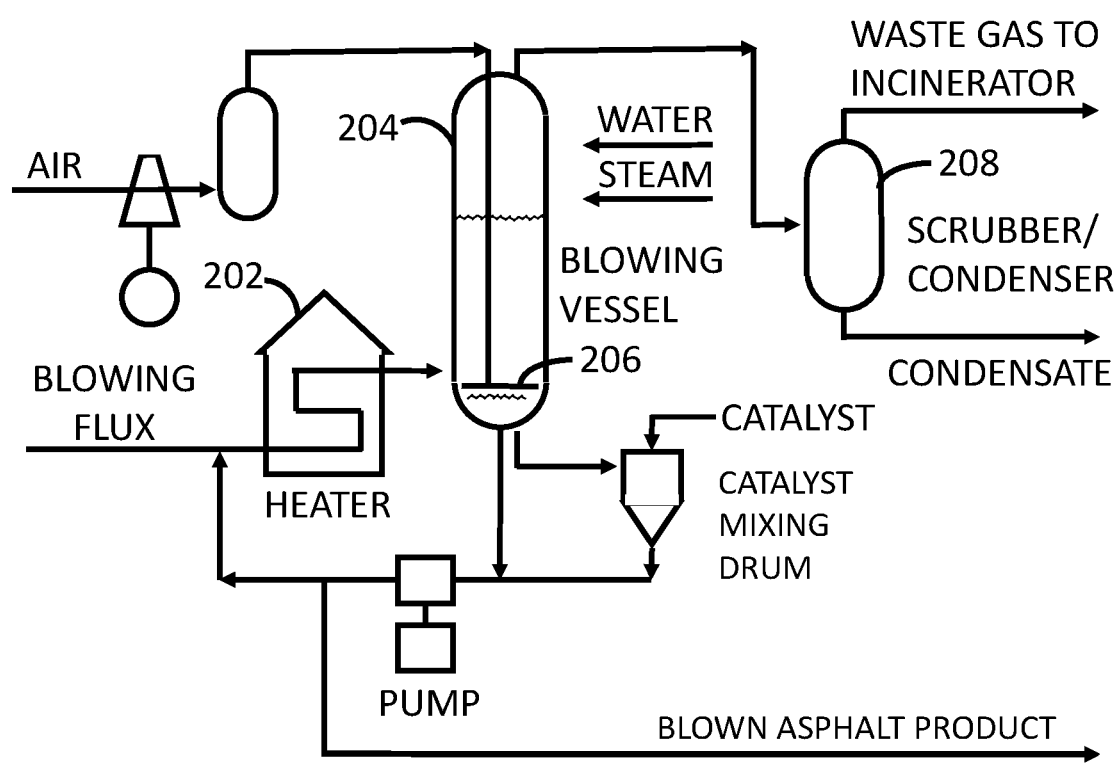
FIG. 2 shows an illustrative batch air blowing process.

The method then proceeds to block 104 where the asphalt feedstock is oxidized using an illustrative air blowing process as shown in FIG. 2. The asphalt feedstock is oxidized to convert the majority of the maltene fraction into asphaltene. The asphalt feedstock is oxidized or "blown" until the oxidized asphalt feedstock has the physical properties of a penetration below 15 dmm and softening point above 205° F. More preferably, the oxidized asphalt feedstock has a penetration of approximately 10 dmm or less and a softening point of 220° F. or higher. The oxidation may be conducted with or without a catalyst that can be added before or during the oxidation process. Additionally, a polyphosphoric acid may be added before, during or after the oxidation process.

Referring to FIG. 2 there is shown an illustrative batch air blowing process 202. In an illustrative oxidation process, asphalt feedstock is preheated at heater 202 and then pumped from storage (not shown) to the blowing vessel 204 until the tower is filled to the desired operating level, e.g. 65%-75% of the column height. The blowing vessel 204 is a vertical vessel equipped with an air distribution component 206 at the bottom of the blowing vessel 204. The blowing vessel may also be heated by a separate heating component (not shown). When the illustrative feedstock asphalt reaches the desired temperature of between 350° F. to 450° F., air is introduced at the bottom of the still and the heating is shut down. Oxygen from the air reacts with asphalt. The reaction in vessel 204 is exothermic and causes the temperature to rise to the desired blowing point.

As the temperature rises, further cooling becomes necessary to maintain the temperature within the prescribed limits. For cooling, water is introduced on to the surface of the feedstock asphalt through a nozzle at the top of the blowing vessel 204. The latent heat of vaporization of the water provides the cooling, and because the water is immediately converted to steam, there is no water that is combined with the oxidized asphalt. Fumes produced in the oxidation process may be disposed of by with a scrubber/condenser 208.

In a still further illustrative embodiment, a mixture of non-roofing grade asphalts and reclaimed oils such as motor oil at wt % of no more than 30% reclaimed oil oxidized to an ASTM D36 softening point of 205 F or higher allowing the ASTM D5 penetration at 77° F. to drop below the minimum specification of 15 dmm. The oxidation may be conducted with or without a catalyst that can be added before or during the oxidation process. A further embodiment includes the addition of polyphosphoric acid added before, during, or after the oxidation process.

In a yet further illustrative embodiment, a mixture of non-roofing grade asphalts and high flash refinery oils referred to as slack oil or slack wax at a wt % addition of no more than 30% reclaimed oil is oxidized to an ASTM D5 penetration at 77° F. to drop below the minimum specification value of 15 dmm. The oxidation may be conducted with or without a catalyst that can be added before or during the oxidation process. A further embodiment includes the addition of polyphosphoric acid added before, during or after the oxidation process.

Generating the First Concentrate

Referring back to FIG. 1, the method then proceeds to blocks 106 and 108 where the first concentrate is pre-blended and pre-heated. More generally, the first concentrate blends include an elastomeric polymer and a flux. More specifically, the first concentrate includes a blend of SBC and asphalt flux that is mixed in a separate vessel (not shown) to generate a first concentrate. This first concentrate is then heated in the separate vessel as represented by block 108. More specifically, the first concentrate is first pre-blended in a separate vessel, and the first concentrate is then heated to a temperature of approximately 360° F. for approximately 30-60 minutes. This first concentrate may also be referred as a "synthetic maltene" or as a "modified naphthenic base oil."

In an illustrative embodiment, 16% by weight of the SBC is combined with 84% by weight of the asphalt flux in the first concentrate.

More generally, proportions of SBC to asphalt flux may range from 2% to 50% by weight of SBC. More narrowly, the amount of SBC to asphalt flux ranges from 2% to 25%. The amount of SBC added depends on the type of asphalt feedstock.

The illustrative asphalt fluxes include, but are not limited to, oils such as San Joaquin Refining Base Oil "Reffene 2000L", which is capable of dissolving the SBC. More generally, the flux is a soft asphalt flux that is compatible with the SBC, such as SBS, and typically has D2007 Clay Gel analysis with aromatics of about 20% to 40% and asphaltenes less than 20%.

In another illustrative embodiment, the first concentrate includes a 5% to 50% by weight of a specific polymer, e.g. SBC, and an oil or asphalt component having a COC flash in excess of 550 F is prepared. For example, the specific polymer, e.g. SBC, is added to non-oxidized asphalt feedstock in a necessary quantity (5% wt to 30% wt) and then heated to produce the first concentrate. The process of mixing the specific polymer with the non-oxidized asphalt feedstock to generate the first concentrate which is then mixed with the oxidized asphalt feedstock is referred to as "flux back."

In a preferred illustrative embodiment, the first concentrate includes mixing 5% to 25% by weight of Styrenic Block Copolymer (SBC), e.g. SBS, with asphalt flux that has a penetration at 77° F. of 100 dmm to more than 400 dmm.

In another illustrative embodiment, the first concentrate includes mixing a 3% to 15% by weight of Styrenic Block Copolymer (SBC), e.g. SBS, and a 3% to 15% by weight of ethylene polymer with an asphalt flux having a penetration at 77° F. of 100 dmm to more than 400 dmm.

In yet another embodiment, the first concentrate includes mixing a 3% to 15% by weight of Styrenic Block Copolymer (SBC), e.g. SBS, and a 3% to 15% by weight of ethylene propylene copolymer with an asphalt flux having a penetration at 77° F. of 100 dmm to more than 400 dmm.

In a further embodiment, the first concentrate includes mixing a 3% to 15% by weight of Styrenic Block Copolymer (SBC), e.g. SBS, and a 3% to 15% by weight of functionalized olefinic copolymer with an asphalt flux having a penetration at 77° F. of 100 dmm to more than 400 dmm.

In a further still embodiment, the first concentrate includes mixing a 5% to 40% by weight of Ethylene Bis Stearamide (EBS) and a 1% to 15% by weight of Trisodium Phosphate (TSP) in an asphalt flux having a penetration at 77° F. of 100 dmm to more than 400 dmm.

Combining the Oxidized Asphalt with the First Concentrate

The method then proceeds to block 110 where the heated first concentrate is mixed with the oxidized asphalt feedstock. The method then proceeds to block 112 where the mixture of the heated first concentrate and the oxidized asphalt feedstock is then heated to generate the second concentrate, e.g. the shingle roof coating.

By way of example and not of limitation, the first concentrate is mixed with oxidized asphalt feedstock at 350° F.-380° F. for a period of 30 minutes to 1 hour to generate the second concentrate, e.g. shingle roof coating, which complies with ASTM D3462 requirements.

For illustrative purposes only, a mixture of 25% by weight of the first concentrate (having 16% by weight of SBC) is mixed with 75% by weight of the oxidized asphalt feedstock resulting in the second concentrate having a 4% by weight of SBC.

In one embodiment, the second concentrate includes a mixture of a 5% to 30% by weight of the first concentrate, e.g. the synthetic maltene, with the remainder being the oxidized asphalt feedstock.

The percentage by weight of SBC depends on the type of feedstock asphalt. By way of example and not of limitation, there may be between 0.5% to 6% by weight of SBC in the second concentrate. The resulting second concentrate, e.g. shingle roof coating, has the physical properties of a penetration that exceeds 15 dmm and a softening point that is above 190° F., and complies with the ASTM D3462 requirements.

The methods and compositions presented herein seek to maximize the asphaltene content of the oxidized asphalt by blowing the penetration below 15 dmm and then reconstituting the oxidized coating asphalt with a polymer modified maltene fraction to allow a wide range of asphalt feedstocks to be used to prepare shingle coating. This is a key differentiating factor when compared to typical preparation. In this technology, the asphalt flux is intentionally oxidized below the accepted industry standard to remove and convert native maltene fraction into asphaltenes that are then solubilized in a rubberized oil concentrate creating a more stable roof coating.

Figure 3:
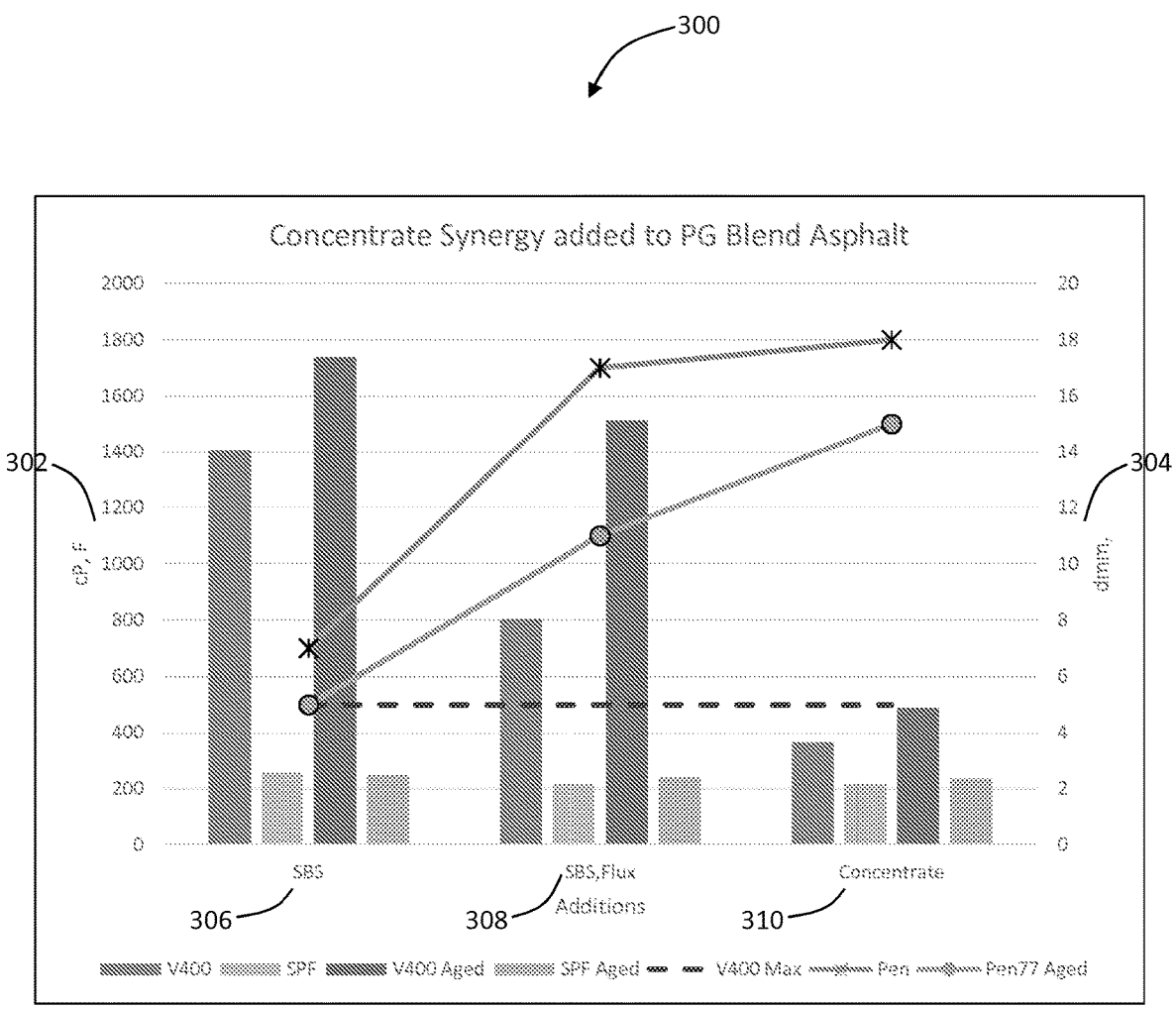
FIG. 3 shows a chart that presents the unexpected results associated with the shingle roof coating method and compositions presented herein.

Referring to FIG. 3 there is shown chart 300 that presents the unexpected results associated with the shingle roof coating method and compositions presented herein. The chart presents the viscosity and softening point 302 on the left y-axis and the penetration 304 on the right y-axis. The x-axis presents the results of three separate different first concentrates that are combined with the oxidized asphalt feedstock, which for illustrative purposes only is a PG Blend asphalt.

The desired softening point of the shingle coating or second concentrate is a softening point that is greater than 190° F., a desired penetration of 15 dmm or greater, a viscosity of less than 500 cP, and a stain index of less than 20.

The first sample 306 is labeled "SBS" and shows the results of directly mixing an SBC polymer, such as SBS, with an oxidized PG Blend asphalt feedstock. The oxidized asphalt feedstock is subjected to the oxidation process steps of blocks 102 and 104 described above. Additionally, the combination of SBS and oxidized asphalt feedstock is then heated to 350° F.-380° F. for a period of 30 minutes to 1 hour as described in blocks 110 and 112 above. The measured physical properties of the SBS combined with the oxidized asphalt feedstock results in a viscosity of 1405 cP, a softening point of 255° F., and a penetration of 7 dmm.

The second sample 308 is labeled "SBS/Flux" and presents the results of mixing SBS, an asphalt flux and the same oxidized PG Blend asphalt feedstock without pre-blending and heating the SBS and asphalt flux. The oxidized asphalt feedstock is subjected to the oxidation process steps of blocks 102 and 104 described above. The SBS and flux are added directly to the oxidized asphalt feedstock and then heated to 350° F.-380° F. for a period of 30 minutes to 1 hour as described in blocks 110 and 112. In the second sample 308, the SBS and flux are not blended separately and heated separately as described in process steps 106 and 108 described above. The measured physical properties of the SBS, flux and combined with the oxidized asphalt feedstock results in a viscosity of 803 cP, a softening point of 217° F., and a penetration of 17 dmm. The SBS and flux may be added serially, i.e. one after the other, or simultaneously, i.e. at the same time, and achieve similar results.

In the third sample 310 which is labeled "Concentrate," the results of pre-blending and pre-heating the SBS and asphalt flux before mixing with the same oxidized PG Blend asphalt feedstock is shown. The oxidized asphalt feedstock is subjected to the oxidation process steps of blocks 102 and 104 described above. In the third sample 310, the SBS and flux are blended separately and heated separately as described in process steps 106 and 108 described above. The pre-blended and pre-heated SBS and flux combination is added directly to the oxidized asphalt feedstock and then heated to 350° F.-380° F. for a period of 30 minutes to 1 hour as described in blocks 110 and 112. The measured physical properties of the second concentrate results in a viscosity of 365 cP, a softening point of 217° F., and a penetration of 18 dmm.

Table 1 presents a summary of the results for the first sample 306, the second sample 308, and the third sample 310. The samples have not been aged.

TABLE 1

Physical Properties for Unaged Samples

| Properties | SBS | SBS/Flux | Concentrate |
| --- | --- | --- | --- |
| V400, cP | 1405 | 803 | 365 |
| Penetration, dmm | 7 | 17 | 18 |
| Softening Point, ° F. | 255 | 217 | 216 |
| V400 Max, cP | 500 | 500 | 500 |

The samples 306, 308 and 310 were then subjected to an aging process consistent with ASTM D6521 as shown in Table 2. More generally, the aging process refers to placing the coating samples in a pressure vessel at 1 atmosphere for 24 hours at 212° F. The results of subjecting the first SBS sample 306 to aging is an aged viscosity of 1738 cP, an aged penetration of 5 dmm, and an aged softening point of 250° F. For aging the second SBS/Flux sample 308, the physical properties include an aged viscosity of 1514 cP, an aged penetration of 11 and an aged softening point of 240° F. With respect to the third aged concentrate sample 310, the measured properties include an aged viscosity of 490 cP (which is below the desired maximum viscosity of 500 cP), a penetration of 15 dmm (which complies with ASTM 3462 requirements) and an aged softening point of 235° F.

Table 2 presents a summary of the results for the aged first sample 306, the aged second sample 308 and the aged third sample 310.

TABLE 2

Physical Properties for Aged Samples

| Properties | SBS | SBS/Flux | Concentrate |
| --- | --- | --- | --- |
| V400, cP | 1738 | 1514 | 490 |
| Penetration, dmm | 5 | 11 | 15 |
| Softening Point, ° F. | 250 | 240 | 235 |
| V400 Max, cP | 500 | 500 | 500 |

When comparing the aged samples to the unaged samples, the result indicate a general trend that penetration values generally decrease with aging, and viscosity generally increases with aging. Interestingly, for the three samples, the softening points were unpredictable and may increase or decrease with aging.

Most notably, the results of FIG. 3 show the significance of pre-blending and pre-heating the illustrative SBS and asphalt flux before mixing with the same oxidized PG Blend asphalt feedstock. Additionally, oxidizing the asphalt feedstock to a softening point greater than 205° F. and a penetration of less than 15 dmm at 77° F. is also significant. Furthermore, combining and heating the oxidized asphalt feedstock with the pre-blended and pre-heated SBC and asphalt flux is also significant.

The method and compositions presented herein provide precise control over the coating viscosity and the composition and weight percent addition of the concentrate allows for increasing shingle manufacturing speeds. Additionally, the methods and compositions presented herein minimize staining of roof shingles by reconstituting the maltene fraction with the polymer modified concentrate, in compliance of ASTM D27 46-07. Furthermore, the methods and compositions improve impact resistance of shingle coating by reducing the effect of hail damage when the maltene fraction is reconstituted with polymer modified concentrates composed of SBC and OPE. Further still, the methods and compositions improve granule adhesion because of the enhanced adhesion characteristics of reconstituted maltene fraction with the polymer concentrate. Further yet, the methods and compositions increase shear tear strength because of the polymer incorporation into the reconstituted maltene fraction of the oxidized coating.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. An asphalt composition comprising:
   a first asphalt feedstock;
   a first concentrate including an elastomeric polymer and an asphalt flux;
   wherein the asphalt composition includes 0.5% to 6% by weight of the elastomeric polymer;
   wherein the elastomeric polymer includes a styrenic block copolymer;
   wherein the first concentrate includes 3% by weight to 25% by weight of the styrenic block copolymer;
   wherein the first concentrate includes 3% by weight to 15% by weight of one of an ethylene polymer and an ethylene propylene copolymer; and
   wherein the first concentrate has a penetration of at least 100 dmm.

2. The asphalt composition of claim 1 including 1.5% to 4.5% by weight of the elastomeric polymer.

3. The asphalt composition of claim 1 having a penetration that exceeds 15 dmm and a softening point that is above 190° F.

4. The asphalt composition of claim 1 having a penetration that exceeds 50 dmm and a softening point that is above 190° F.

5. The asphalt composition of claim 1 wherein the first asphalt feedstock has a softening point greater than 220° F. and a penetration less than 10 dmm at 77° F.

6. The asphalt composition of claim 1 wherein the styrenic block copolymer includes Styrene-Butadiene-Styrene (SBS).

7. The asphalt composition of claim 1 wherein the first concentrate includes 3% by weight to 15% by weight of the styrenic block copolymer in the asphalt flux, wherein the first concentrate has a penetration of at least 100 dmm.

8. The asphalt composition of claim 1 wherein the first asphalt feedstock includes a mixture of non-roofing grade asphalts and reclaimed oils.

9. The asphalt composition of claim 1 wherein the first asphalt feedstock includes a mixture of non-roofing grade asphalts and high flash refinery oils.

* * * * *